Sept. 3, 1940.                    J. ALDER ET AL                     2,213,481
            MACHINE FOR THE PRODUCTION OF ARC-WELDING ELECTRODES
                              Filed April 4, 1938
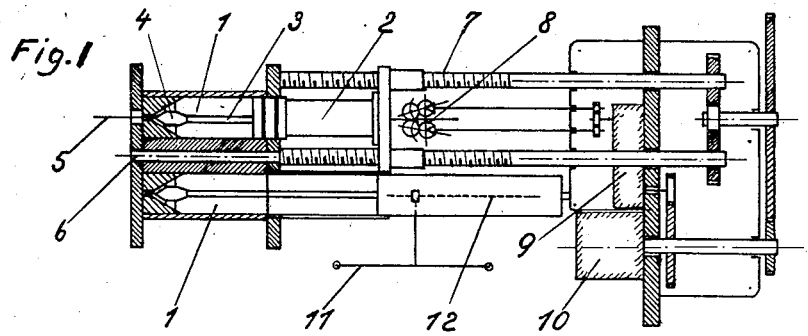
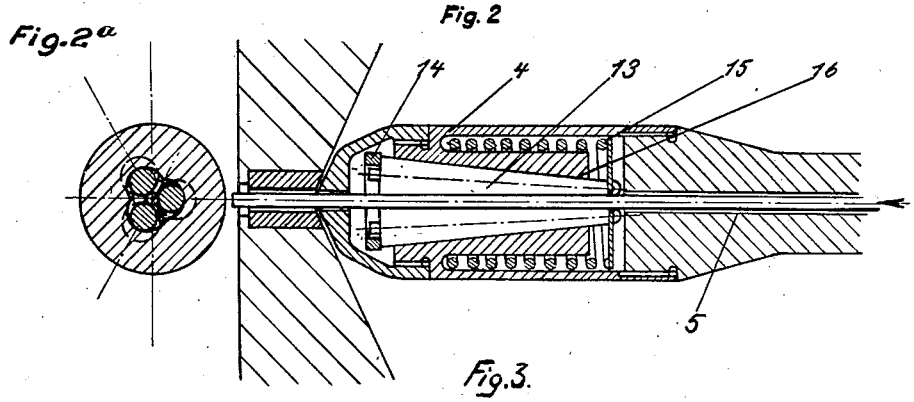
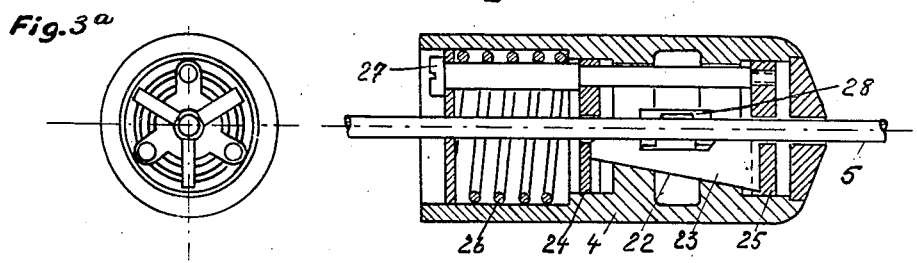
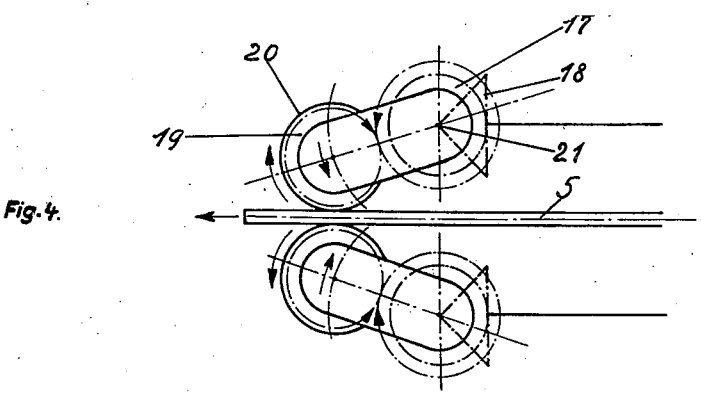
INVENTORS
JEAN ALDER
ALOIS GRIZ
ATTORNEYS Patented Sept. 3, 1940

2,213,481

UNITED STATES PATENT OFFICE 2,213,481

MACHINE FOR THE PRODUCTION OF ARC-WELDING ELECTRODES

Jean Alder and Alois Grilz, Zurich, Switzerland

Application April 4, 1938, Serial No. 200,042
In Switzerland April 9, 1937

7 Claims.  (Cl. 18—13)

The manufacture of arc-welding electrodes may generally be divided into two classes: the immersion method and the consolidation or compression method. In the former the bare rods or wires are immersed into a liquid bath of coating or enveloping material, taken out of the bath and dried. This method of manufacture possesses the disadvantage that the enveloping material upon lifting the electrode out of the bath dissociates, since the various constituent elements of the latter, in accordance with their specific gravities, drop off quicker or slower. A uniform and homogeneous composition of the enveloping mass, which is absolutely indispensable for building up a uniform welding seam, therefore cannot be obtained by means of the immersion method.

The thickness of the electrode envelope made according to the latter method also is not uniform. The welding wire nearly always is disposed eccentrically within the envelope, thus causing an unequal degree of flux of the electrode per unit of time. Since the fusing of the envelope, however, serves for neutralizing the arc, alloying the bath of fusion and ameliorating the welding seam by preventing too rapid a cooling, it is absolutely essential to eliminate the variations of the homogeneity, eccentricity and thickness of envelope unavoidable in the case of immersion type electrodes.

Apart from the immersion method various pressing or consolidating processes, essentially working on the principle of the hose presses, are known to the art, by means of which it is sought to eliminate the disadvantages cited. It is to be said, however, that these latter processes fail to positively guarantee absolutely concentric electrodes.

In all pressing methods it is essential to build up the electrode envelope of materials with such a low plasticity that the constituent elements do not dissociate neither during the manufacture of the electrode nor during the preparation of the coating material. Only in this way is one able to attain an absolutely homogeneous and uniform enveloping structure for the electrode.

The present invention relates to improvements in machines for the production of electrodes of the consolidation type from materials of low plasticity, thus guaranteeing absolutely centric and homogeneous electrodes.

According to the present invention, the electrode cores are guided by tapered rollers extending up to a short distance from the discharge nozzle, thus preventing a change of direction of the travelling electrodes as caused by the pressure of the enveloping material, and thus assuring the production of an absolutely uniform and centric electrode jacket.

Another characteristic point of the present invention is the possibility of accurately adjusting the ratio of electrode advance and volume of enveloping material to be deposited.

The machine for the realization of the advantages cited possesses a centering device in the press cylinders, isolated from the enveloping material and mounted upon an inclined plane, in combination with tapered rollers. This centering device guides the rod or wire to within a short distance from the discharge nozzle, centers the wire and lets pass through any points or portions of the latter which are of a different gauge or diameter, still, however, maintaining its centering action. Both cylinder and piston are pierced by a guide tube, the core of which is adapted to the wire gauge in question. In order to overcome any resistances arising during the passage of the wire, especially those due to gauge variations, a wire transporting device is provided within the press pistons which is adapted so as to cling to the electrode core with a force directly proportional to the degree of resistance met.

In order to obtain always a uniform thickness of envelope, i. e. an accurate setting of the correct ratio of enveloping material and electrode feed, a stepless regulating gearing is provided, which permits of a regulation of the core wire feed independent of the piston advance. Finally, and for the purpose of keeping the machine ready for operation at all times, two cylinders are provided for, one of which is being filled, while the other is in operation.

The present invention is illustrated, by way of example, in the accompanying drawing, in which—

Fig. 1 is a schematic view of the machine, partly in section;

Fig. 2 is a longitudinal sectional view of the centering device;

Fig. 2a is a vertical section taken approximately through the center of the centering device shown in Fig. 2;

Fig. 3 shows a modified form of the centering mechanism;

Fig. 3a is an end view of the device shown in Fig. 3; and

Fig. 4 shows diagrammatically the wire feeding mechanism.

The piston 2 moves within the cylinder 1 and is actuated by the spindles 7 which are driven by the motor 10. The centering device 4, from which an electrode 5 issues, is housed in the cylinder 1. The guide tube 3 passes through the cylinder and piston. The wire feeding or transporting device 8 is driven by a stepless regulating gearing 9 over bevel gears.

The centering device according to Fig. 2 comprises the tapered rollers 13 confined within a cage. The said rollers 13 pass along with the wire as soon as a thickened portion of the wire is drawn up and thus give more room by sliding upon the conical surface 16. At the same time, however, the spring 15 is compressed, and the tapered rollers 13 are consequently returned into their starting or initial position as soon as the said thickened portion of wire has passed by.

The second form of centering device (Fig. 3) comprises a slender metal cone 22, housed in the casing 4 and in which three radially disposed leaves 23 slide in a longitudinal direction. The leaves 23 are radially guided by two discs 24 and 25, their ends sliding in a rectangular slot of the latter. The leaves 23, furthermore, are tapered on the outside, and are always pushed down into the cone 22 by means of a spring 26 and three axially disposed guide screws 27. Finally, a spring 28 is embedded between the said guide leaves 23, which prevents the latter from falling together when guiding the wire horizontally after the electrode wire 5 has been withdrawn.

As in the first form of the centering device (Fig. 2), the form according to Fig. 3 also provides for the passage of any thickened portion of wire by displacing the leaves 23 in the direction of the advancing wire, meanwhile fully maintaining the centering action. The said leaves 23 slide, as shown, within the cone 22. If, now, the leaves become displaced in the direction of the advancing wire, they give more room free. The spring 26 now is compressed. As soon as the thickened portion of wire has passed by, however, the spring 26 again returns the leaves 23 into their normal position.

The wire transporting device 8, shown in Fig. 4, is driven by the bevel gears 18. The further transmission of power takes place by way of the pinions 17 and 19. A fluted roller 20 is mounted on the pinion 19 which transports the electrode core or wire proper. As seen from Fig. 4, the transporting device comprises two identical parts engaging the electrode core from two sides. Since the sense of rotation of these two parts is opposed, the device upon meeting with a resistance rotates about the axle 21 and clings to the electrode 5 with a force corresponding to the said resistance.

As shown in Fig. 1, two cylinders 1 are provided, which may be swung about the axle 6. While one of these cylinders is in the operative position, the other may be filled with the enveloping material. This filling operation is done by means of a piston moved by a handwheel 11 and a rack 12.

The machine, briefly, operates as follows:

The wire transporting device 8 feeds an electrode wire into the guide tube 3 which passes through the cylinder and piston, and then passes it along into the centering device. At the point where the electrode leaves the latter, i. e. immediately back of the discharge nozzle, the enveloping material in the cylinder 1 approaches the electrode wire and starts to envelop the latter.

What we claim and desire to secure by Letters Patent is:

1. An electrode enveloping machine of the character described comprising a press cylinder containing a wire centering device in combination with a wire feeding device; a pressure piston in the cylinder; a nozzle at the discharge end of the cylinder; the wire centering device comprising a plurality of tapered rollers extending to within a short distance of the discharge nozzle of the cylinder and disposed about the axis of the wire to be fed and mounted with an element in parallelism with said axis, means presenting inclined surfaces upon which the said rollers are mounted, and means for separating the contents of the cylinder from the rollers; the wire feeding device comprising a plurality of pinions and bevelled gears, and a fluted roller mounted on one of the said pinions; said tapered rollers being displaced on the inclined plane when a wire portion of enlarged diameter passes through the centering device and acting to confine the wire in centered position with respect to the axis of the nozzle.

2. In an electrode enveloping machine of the character described, a press cylinder containing a wire centering device comprising a hardened cone in which three radially guided leaves are disposed, means for guiding said leaves for radial movement, whereby said leaves are separable at their inner edges for variable distances, and spring-pressed mechanism acting to urge the leaves into the cone and thereby cause said inner edges to engage and guide an electrode wire or rod being fed through the cylinder.

3. A machine according to claim 1, including a guide tube passing through the press cylinder and its piston.

4. A machine according to claim 1, wherein the wire transporting device is mounted and movable with the piston, the driving rolls of said device being yieldingly mounted in such manner that upon meeting with resistance during the advance of the wire they engage the wire with greater force.

5. A machine according to claim 1, wherein the bevel gears are in the form of friction gears which are adjustable to control the core wire speed independently of the piston advance.

6. A machine according to claim 1, wherein two press cylinders are provided, said cylinders being movable to bring one into the operating position while the other is brought to position for filling with the electrode-enveloping material.

7. An electrode enveloping machine comprising a press cylinder containing a wire centering device, a piston cooperating with the cylinder and a wire feeding device arranged to feed a wire to be coated into the wire centering device, said wire centering device including a plurality of tapered members arranged about the axis of the wire to be fed through the device and having a surface arranged in parallelism with said axis, resilient means urging said tapered members in unison toward the wire to center the same and supporting means for said members having inclined surfaces contacted by inclined surfaces of the tapered members to enable said members to move in unison away from the said axis when a thickened portion of the wire passes through the centering device.

JEAN ALDER.
ALOIS GRILZ.